United States Patent Office 3,072,644
Patented Jan. 8, 1963

3,072,644
20:21-KETOLS OF THE PREGNANE SERIES AND PROCESS FOR THEIR MANUFACTURE
Albert Wettstein, Riehen, and Karl Heusler and Peter Wieland, Basel, Switzerland, assignors to Ciba Corporation, a corporation of Delaware
No Drawing. Filed June 10, 1960, Ser. No. 35,135
Claims priority, application Switzerland June 12, 1959
12 Claims. (Cl. 260—239.55)

The present invention provides an improved process for the manufacture of 20:21-ketols of the pregnane series and of their esters from $\Delta^{16}$-20-oxo-pregnene-21-acid esters, and therefore represents a considerable advance in the synthesis of various important corticoidal hormones. According to a known process the aforementioned esters can be converted into 20:21-ketols by first saturating the 16,17-double bond by catalytic hydrogenation, reducing the keto ester formed with lithium aluminium hydride to form the 20:21-diol and finally subjecting the 21-hydroxyl group to selective esterification, for example acetylation and then reoxidizing the free 20-hydroxyl group again to the keto group by means of an oxidizing agent, such as the pyridine chromium trioxide complex. However, that process comprises several stages so that the total yield is relatively poor.

The present process is especially important for the manufacture of 18-substituted 20:21-ketols of the pregnane series, since the correspondingly substituted $\Delta^{16}$-20-oxo-pregnane-21-acid esters are readily accessible by total synthesis. By the present process it is easy to prepare in a simple manner from $\Delta^{5,16}$-3-ethylenedioxy-11$\beta$:18-oxido-18 - tetrahydropyranyloxy - 20 - oxo - pregnadiene - 21-acid-methyl-ester the highly active aldosterone which, as is known, is of great significance in the regulation of mineral metabolism.

The above named starting materials are easy to prepare by a known process from 16-ketones unsubstituted in the 17-position, according to which process the 16-ketone is condensed with an oxalic ester, the condensation product is acetylated to the 20-enol acetate, advantageously after having converted the 21-ester function into an amide group, for example a morpholide group, and finally the keto group in the 16-position is reduced to the hydroxyl group catalytically or by means of sodium boron hydride. The $\Delta^{16}$-20-oxo-pregnene-21-acid esters are then obtained by alkaline hydrolysis and esterification. This procedure is disclosed in our U.S. Patent No. 3,002,971 of October 3, 1961.

The present invention is based on the observation that 20:21 ketols of the pregnane series and their esters can be prepared in a much simpler manner by hydrogenating a $\Delta^{16}$-20-oxo-pregnene-21-acid ester in a neutral medium, reducing the resulting $\Delta^{17}$-20-hydroxy-pregnene-21-acid-ester in a medium free from hydroxyl groups by means of a complex metal hydride, if desired, after having esterified or etherified the enolic 20-hydroxyl group, hydrolyzing any enol-derivative in the 20-position to form the free 20-ketone and, if desired, esterifying the free hydroxyl group in the 21-position.

The catalytic hydrogenation of the $\Delta^{16}$-20-oxo-21-carboxylic acid esters used as starting material is advantageously carried out with a palladium catalyst, for example, palladium black or with palladium on a support such as calcium carbonate, zinc carbonate, strontium carbonate, animal charcoal, barium sulfate or the like. When the hydrogenation as carried out according to the present process in a neutral medium, this operation surprisingly does not cause simple saturation of the 16,17-double bond, but there is formed by 1,4-additive combination at the $\alpha$:$\beta$-unsaturated ketone a $\Delta^{17(20)}$-20-hydroxy-compound, which is easy to identify in the ultra-violet spectrum by its absorption bands at about 250–255 m$\mu$. This enol is converted by a small proportion of an alkali or acid into the 20-ketone. This is why the hydrogenation is carried out in a neutral medium, preferably in an ether such as tetrahydrofuran, dioxane, glycol dimethyl ether or polyglycol dimethyl ether. Likewise suitable are ethyl acetate and alcohols such as methanol or ethanol, provided they are free from impurities of acid or alkaline reaction. Upon crystallization or long standing in such a solvent slow partial conversion of the $\Delta^{17(20)}$-enol into the 20-keto-compound takes place.

Prior to reduction of the 21-acid group the enolic hydroxyl group may be esterified or etherified. Esterification is easy to perform with a reactive derivative of a carboxylic acid, such as an anhydride or halide thereof, in the presence of a tertiary organic base, e.g. an aliphatic tertiary base, such as trimethylamine, triethylamine, tributylamine, an alicyclic tertiary base, such as dimethylcyclohexylamine, a mixed aromatic aliphatic amine, such as dimethyl-aniline, dimethylbenzylamine etc., and a cyclic base, such as pyridine, a picoline, a lutidine, collidine etc. This operation yields for example, the 20-acetates, propionates or benzoates. Alternatively, the enolic hydroxyl group may be etherified, for example, with dihydropyrane in the presence of pyridine hydrochloride to yield the tetrahydropyranyl ether, or with an alkyl iodide, for example, methyl iodide, ethyl iodide, isopropyl iodide or the like, if desired, in an inert anhydrous solvent, for example, in acetone, in the presence of an alkaline condensing agent such as anhydrous potassium carbonate or sodium hydride. Alternatively, the etherification with an alkyl halide may be carried out by first preparing the sodium salt of the enol with the aid of sodium triphenylmethylate, and then reacting it with an alkyl halide. The 20-hydroxyl group can also be reacted with trimethyl chlorosilane in the presence of pyridine to form the trimethyl silyl ether.

An especially high yield of an enol-derivative, especially an enol-ester, is obtained by esterifying the $\Delta^{17(20)}$-20-hydroxy-21-carboxylic acid ester immediately after its formation, and before partial ketonization occurs. It is, therefore, especially advantageous to carry out the catalytic hydrogenation in a lower fatty acid anhydride, for example, acetic anhydride, propionic anhydride etc., if desired, with the addition of a diluent, such as tetrahydrofuran, ethyl acetate or the like, and, immediately the absorption of hydrogen ceases, to esterify the enol formed by the addition of a tertiary base, such as pyridine or collidine, to the hydrogenation solution. In this manner, the enol-ester can be prepared in substantially quantitative yield.

For the reduction in the process of the invention with a complex metal hydride there are used hydrides that are capable of reducing ester groups in a solvent free from hydroxyl groups, such as lithium-aluminum hydride, lithium-trimethoxy-aluminum hydride, lithium-boron hydride, magnesium-aluminum hydride, calcium-boron hydride, lithium-gallium hydride or the like. Particularly suitable solvents are cyclic or open-chain ethers such as tetrahydrofuran, dioxane, diethyl ether, glycol dimethyl ether, polyglycol dimethyl ethers and the like. The free enolic 20-hydroxyl group, or the enolic 20-hydroxyl group esterified with a carboxylic acid, is converted by the reduction into a metal enolate salt while the 21-ester group is reduced to a carbinol group.

The decomposition with water or with an acid yields the 20-21-ketol directly. On the other hand, when a 20-ether is used for the reduction, it must be split by a mild acid treatment, for example, by a short heating with dilute acetic acid. The trimethylsilyl ether, which likewise remains unaffected during the reduction with a metal hydride, is easy to split with water, if necessary with slight heating. When an acid, such as dilute acetic acid, is used in the treatment, other protective groups, such as ketals or tetrahydropyranyl ethers, may be split up simultaneously.

If desired, a resulting free 21-hydroxyl group can be esterified at any stage of the process; this is achieved with the use of a reactive derivative of a saturated or unsaturated aliphatic, cycloaliphatic, aromatic, araliphatic or heterocyclic carboxylic acid, such as formic acid, acetic acid, trifluoracetic acid, propionic acid, butyric acids, valeric acids such as n-valeric acid or trimethylacetic acid, caproic acids such as β-trimethylpropionic acid, oenanthic acid, caprylic, pelargonic, capric, undecylic acids, for example the undecylenic acid, lauric, myristic, palmitic or stearic acids, for example of oleic acid, cyclopentylacetic, cyclohexylacetic or phenylacetic acids or -propionic acids, of benzoic, hexahydrobenzoic acid, furan-2-carboxylic acid, nicotinic acids, also of dicarboxylic acids such as oxalic, succinic or glutaric acids, of substituted carboxylic acids such as β-ketocarboxylic acids, for example of the acetoacetic, propionylacetic, butyrylacetic or caprionylacetic acid or of amino acids.

The present invention also includes compounds of the formula

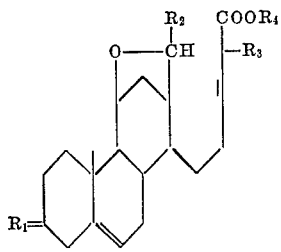

in which $R_1$ represents a protected, more especially ketalized, oxo groups; $R_2$ and $R_3$ represent a free, esterified or etherified hydroxyl group each, and $R_4$ stands for an alkyl group. These compounds are important intermediates in the process described above and are used in the manufacture of aldosterone. Of special importance are compounds in which $R_1$ stands for an oxo group ketalized with a lower divalent aliphatic alcohol, such as an ethylenedioxy or propylenedioxy group, $R_2$ for an etherified hydroxyl group, preferably one having from 1 to 8 carbon atoms, such as a tetrahydropyranyloxy group, and $R_3$ for a free hydroxyl group, or a hydroxyl group esterified with a lower aliphatic carboxylic acid, such as an acetoxy, propionyloxy or a trimethylsilyl group, and $R_4$ for a lower alkyl group, such as a methyl, ethyl, propyl or isopropyl group.

The compounds obtained by the present process are racemates or optically active compounds. Racemates can be resolved in an as such known manner into their antipodes.

The present process further includes any modification thereof in which only some of the process steps are carried out in any desired order of succession, or in which an intermediate obtained at any stage of the process is used as starting material and the remaining step or steps of the process are carried out.

The invention is illustrated by the following examples.

*Example 1*

500 mg. of d:l-$\Delta^{5:16}$-3-ethylenedioxy-11β:18-oxido-18-tetrahydropyranyloxy-20-oxo-pregnadiene-21-acid methyl ester are added to 100 mg. of prehydrogenated palladium barium sulfate catalyst of 10% strength in 50 cc. of peroxide-free tetrahydrofurane, and the mixture is stirred at 30° C. under hydrogen until the absorption of gas ceases. The catalyst is then filtered off, and the filtrate is evaporated to dryness under a water-jet vacuum. Crystallization of the residue from ether yields 229 mg. of d:l-$\Delta^5$-3 ethylenedioxy - 11β:18 - oxido-18-tetra-hydropyranyloxy-20-oxo-pregnene-21-acid methyl ester in small prisms melting at 220–223° C. Upon allowing the mother liquor to stand there separate out small needles melting at 175–189° C., which contain, in addition to the aforesaid 20-ketone, d:l - $\Delta^{5:17(20)}$-3-ethylenedioxy-11β:18-oxido-18-tetrahydropyranyloxy - 20 - hydroxy-pregnadiene-21-acid methyl ester. These crystals exhibit in the ultra-violet spectrum an absorption maximum at 252 mμ (ε=about 5000) and in the infrared spectrum bands at 2.85μ and 2.95μ (hydroxyl); 5.82μ (ester) and at 6.10μ (enol double bond).

70 mg. of this crude enol are acetylated overnight at room temperature in a mixture of 0.7 cc. of pyridine and 0.7 cc. of acetanhydride. The reaction mixture is poured into ice-water and the reaction product is extracted with methylene chloride. After being washed with dilute hydrochloric acid and then with sodium bicarbonate solution, and then dried, the extracts yield 84 mg. of crystals melting at 180–192° C., which contain d:l-$\Delta^{5:17(20)}$-3-ethylenedioxy - 11β:18 - oxido-18-tetrahydro-pyranyloxy-20-acetoxy-pregnadiene-21-acid methyl ester. The ultra-violet spectrum of this crystalline mixture exhibits an absorption maximum at 228 mμ (ε=5800).

For making the enol acetate it is of advantage not to isolate the enol in crystalline form but to subject the crude hydrogenation product, from which the sparingly soluble keto-ester has been removed, to direct acetylation. In this manner there are obtained from 300 mg. of d:l-$\Delta^{5:16}$-3-ethylene-dioxy-11β:18-oxido-18-tetrahydropyranyloxy-20-oxo-pregnadiene-21-acid methyl ester 49 mg. of d:l - $\Delta^5$ - 3 - ethylenedioxy-11β:18-oxido-18-tetrahydropyranyloxy-20-oxo-pregnene-21-acid methyl ester and by acetylating the mother liquor with 3 cc. of pyridine and 3 cc. of acetanhydride 280 mg. of crude enol acetate which, on crystallization from ether+hexane, yields 170 mg. of d:l-$\Delta^{5:17(20)}$-3-ethylenedioxy-11β:18-oxido-18-tetrahydropyranyloxy-20-acetoxy-pregnadiene-21 - acid methyl ester.

By hydrogenating in an analogous manner 300 mg. of d:l-$\Delta^{5:16:18}$-3-ethylenedioxy-11β:18a-oxido-18a-methyl-18-homo-20-oxo-14β-pregnatriene-21-acid methyl ester with 300 mg. of palladium barium sulfate catalyst of 10% strength in 45 cc. of peroxide-free tetrahydrofuran a crude product is obtained which exhibits an absorption maximum of 255 mμ and contains d:l-$\Delta^{5:17(20):18}$-3-ethylenedioxy-11β:18a-oxido-18a-methyl - 18 - homo-20 - hydroxy-pregnatriene-21-acid methyl ester. Acetylation with pyridine and acetanhydride yields the corresponding crude 20-acetate which can be reduced with lithium aluminium hydride as described in Example 3. After having acetylated the crude product with pyridine and acetanhydride and split up the ketal as described in Example 3, the crude product is subjected to paper-chromatography in the system formamide/benzene-hexane 1:1, and from the zone which reduces blue tetrazolium there is obtained d:l-$\Delta^{4:18}$-3:20-dioxo-11β:18a-oxido-18a-methyl-18-homo-21-acetoxy-14β-pregnadiene.

*Example 2*

A solution of 320 mg. of d:l-$\Delta^{5:16}$-3-ethylenedioxy-11β:18-oxido-18-tetrahydropyranyloxy - 20-oxo - pregnadiene-21-acid methyl ester in 70 cc. of freshly distilled ethyl acetate is treated with 70 mg. of palladium calcium carbonate catalyst of 10% strength and the mixture is stirred under hydrogen until the absorption of gas ceases. The catalyst is then suctioned off and the filtrate is evaporated to dryness in a water-jet vacuum. After having been recrystallized twice from ether, the residue yields 83 mg. of pure d:l-$\Delta^5$-3-ethylenedioxy-11β:18-oxido-18-tetrahydropyranyloxy-20-oxo-pregnene - 21 - acid methyl ester melting at 220–223° C. From the mother liquors a total of 133 mg. of d:l-$\Delta^{5:17(20)}$-3-ethylenedioxy-11β: 18-oxido-18-tetrahydropyranyloxy-20 - hydroxy - pregnadiene-21-acid methyl ester melting at 176–189° C. with decomposition separates out.

200 mg. of the crystalline enol are dissolved in 2.5 cc. of tertiary butanol and 5.0 cc. of methyl iodide, 500 mg. of calcined potassium carbonate are added, and the whole is stirred under reflux for 4 days at 60° C. with exclusion of moisture. The whole is then cooled, diluted with methylene chloride, and the organic solution is repeatedly agitated with water. The methylene chloride solution is dried and evaporated and yields 187 mg. of a neutral fraction which displays a weak absorption maximum at 235 mμ and contains d:l-$\Delta^{5:17(20)}$-3-ethylenedioxy-11β:18-oxido-18 - tetrahydropyranyloxy-20-methoxy-pregnadiene-21-acid methyl ester.

A solution of 153 mg. of the crude methyl ether obtained as described above in 50 cc. of tetrahydrofuran is added with ice-water cooling and stirring under nitrogen to 280 mg. of lithium aluminium hydride and 5 cc. of tetrahydrofuran, stirred for 15 minutes while cooling with ice-water and then for 1 hour at room temperature and while cooling with ice-water a mixture of 5 cc. each of acetanhydride and tetrahydrofuran is added dropwise. The mixture is stirred for 7 hours at room temperature and is then kept for 60 hours at room temperature. Water is added, the mixture is agitated three times with ether, and the ethereal extracts are washed with water, dried and evaporated. The residue is dissolved in 5 cc. of glacial acetic acid and the solution is heated for 5 minutes in a bath kept at 100° C., treated with 0.5 cc. of water, kept for 5 minutes in the bath heated at 100° C. and then poured into 50 cc. of ice-water. The reaction mixture is agitated three times with methylene chloride, and the organic solutions are washed with dilute sodium bicarbonate solution and then with water, dried and evaporated in vacuo. Paper-chromatography of the residue in the system formamide/benzene produces a zone which absorbs in the ultra-violet spectrum and reduces blue tetrazolium, and has the same $R_f$-value as aldosterone-21-monoacetate.

Example 3

1 cc. of a 0.95-molar solution of lithium-aluminium hydride in tetrahydrofuran is added, while cooling with ice and stirring under nitrogen, to a solution of 146 mg. of d:l-$\Delta^{5:17(20)}$-3-ethylenedioxy-11β:18-oxido - 18 - tetrahydropyranyloxy-20-acetoxy-pregnadiene-21 - acid methyl ester (which as indicated by the ultra-violet spectrum ($\epsilon_{228\ m\mu}$=about 5600) contains about 50 percent of the 20-ketone) in 5 cc. of absolute tetrahydrofuran. While allowing the ice to melt, the mixture is then stirred for 2 hours and, while cooling with a mixture of ice and sodium chloride, mixed with 20 cc. of semi-saturated Seignette salt solution. More of the semi-saturated Seignette salt solution is added, the whole is agitated three times with methylene chloride, and the organic solutions are extracted with semi-saturated Seignette salt solution and water, dried and evaporated in a water-jet vacuum. The residue is acetylated overnight at room temperature in a mixture of 2 cc. each of acetanhydride and pyridine, the mixture is treated with xylene, evaporated in a water-jet vacuum, and this operation is repeated once with xylene and twice with benzene. The resulting, practically colorless oil is dissolved in 10 cc. of glacial acetic acid, immersed for 5 minutes in a bath heated at 100° C. while passing over a current of nitrogen, 1 cc. of water is added, and the whole is heated for another 8 minutes at 100° C. It is then diluted with 100 cc. of ice-water, agitated three times with methylene chloride, and the organic solutions are washed with 60 cc. of semi-saturated sodium bicarbonate solution and then with water, dried, and evaporated in a water-jet vacuum. The residue is chromatographed in the system benzene+formamide on 43 sheets of filter paper, and the zone which displays strong ultra-violet absorption, and reduces blue tetrazolium, and migrates the same distance as d:l-aldosterone-21-monoacetate, having an $R_f$-value of 0.3, is cut out. After shredding the paper, is is pasted with 200 cc. of tetrahydrofuran of 20% strength and then suction-filtered. This operation is repeated twice more with 150 cc. of tetrahydrofuran of 20% strength on each occasion and then 3 times with 150 cc. of undiluted tetrahydrofuran on each occasion, and the filtrates are combined and concentrated to about 200 cc. at a bath temperature of 40° C. in a water-jet vacuum. The concentrate is agitated three times with 50 cc. of methylene chloride, washed twice with 40 cc. of water, dried, and evaporated in a water-jet vacuum. The residue is rendered colorless with 20 mg. of carboraffin, recrystallized from acetone+ether, and there are obtained 27 mg. of d:l-aldosterone-21-monoacetate melting at 180–181° C. By paper-chromatographic purification of the motor liquor a further 2.3 meg. of d:l-aldosterone-21-monoacetate, melting at 179.5 to 180.5° C., can be obtained.

Example 4

15 ml. of acetic anhydride are stirred with 500 mg. of a palladium-barium sulfate catalyst of 10% strength under hydrogen at 30° C. until the rate of absorption of gas falls below 1 ml. in every 5 minutes. There are then added 100 mg. of d:l-$\Delta^{5:16}$-3-ethylenedioxy-11β:18-oxido-18 - tetrahydropyranyloxy - 20 - oxo - pregnadiene - 21-acid-methyl ester and the whole is stirred under hydrogen. In the course of 5 minutes the quantity of hydrogen calculated for 1 molar equivalent is absorbed. There are then immediately added 5 ml. of pyridine and the whole is allowed to stand at room temperature overnight. The catalyst is then removed by filtration and the filter residue is washed well with toluene. The filtrate is evaporated almost to dryness under about 1 mm. pressure of mercury, and the residue is taken up in methylene chloride. The solution is washed with water, dried, and then evaporated. The residue consists of almost pure d:l-$\Delta^{5:17(20)}$-3-ethylenedioxy - 11β:18 - oxido - 18 - tetrahydropyranyloxy - 20-acetoxy-pregnadiene-21-acid methyl ester and has a strong absorption maximum ($\epsilon$=11,500) at 229 mμ. By crystallizing the product from a mixture of methylene chloride and ether and from a mixture of benzene and hexane the pure enol-acetate melting at 166–170° C. is obtained, which exhibits in the ultraviolet spectrum a maximum at 228 mμ ($\epsilon$=12,500) and in the infra-red spectrum bands at 5.67μ (enol-acetate), 5.77μ (ester) and 6.00μ (enol).

What is claimed is:

1. Process for the manufacture of 20:21-ketols of the pregnane series, wherein a $\Delta^{16}$-20-oxo-pregnene-21-acid ester is catalytically hydrogenated in a neutral medium, the resulting $\Delta^{17(20)}$-20-hydroxy-pregnene-21-acid ester is treated with a member selected from the group consisting of an esterifying and etherifying agent, and the compound thus obtained is reduced in a medium free from free hydroxyl groups by means of a complex metal hydride in which the metal is selected from the group consisting of those of group Ia, group IIa and group III of the periodic system, and the reduction product is hydrolyzed to form the free 20-ketone.

2. Process for the manufacture of 20:21-ketols of the pregnane series, wherein a $\Delta^{16}$-20-oxo-pregnene-21-acid is catalytically hydrogenated in a neutral medium and the resulting $\Delta^{17(20)}$-20-hydroxy-pregnene-21-acid-ester is reduced in a medium free from free hydroxyl groups by means of a complex metal hydride in which the metal is selected from the group consisting of those of group Ia, group IIa and group III of the periodic system, and the reduction product is hydrolyzed to form the free 20-ketone.

3. Process as claimed in claim 1, wherein a $\Delta^{16}$-20-oxo-pregnene-21-acid ester is hydrogenated in a lower fatty acid anhydride and, immediately the absorption of hydrogen ceases, a tertiary amine is added.

4. Process as claimed in claim 3, wherein catalytic hydrogenation is carried out in acetic anhydride and when the absorption of hydrogen ceases pyridine is added.

5. Process as claimed in claim 1, wherein the reduction is carried out with lithium aluminum hydride.

6. Process as claimed in claim 1, wherein the free 20-enol is acetylated before reduction.

7. Process as claimed in claim 1, wherein the free 20-enol is etherified before reduction.

8. Process as claimed in claim 1, wherein a $\Delta^{16}$-20-oxo-pregnene-21-acid ester substituted in the 18-position is used as starting material.

9. Process as claimed in claim 1, wherein $\Delta^{5,16}$-3-ethylenedioxy - 11$\beta$:18 - oxido - 18 - tetrahydropyranyl-oxy-20-oxo-pregnadiene-21-acid methylester is used as starting material.

10. $\Delta^{5,17}$ - 3 - ethylenedioxy - 11$\beta$:18 - oxido -18 - tetrahydropyranyloxy - 20 - hydroxy - pregnadiene - 21 - acid methylester.

11. $\Delta^{5,17}$ - 3 - ethylenedioxy - 11$\beta$:18 - oxido - 18 - tetrahydropyranyloxy - 20 - acetoxy - pregnadiene - 21 - acid methylester.

12. Compounds of the formula

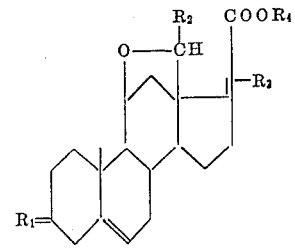

in which $R_1$ stands for an oxo group ketalized with a lower divalent aliphatic alcohol, $R_2$ stands for an etherified hydroxyl group having 1 to 8 carbon atoms, $R_3$ stands for a free hydroxyl group, a hydroxyl group esterified with a lower aliphatic carboxylic acid and a hydroxyl group etherified with a lower alkanol, and $R_4$ for a lower alkyl group.

No references cited.